United States Patent
Liu et al.

(10) Patent No.: US 6,263,331 B1
(45) Date of Patent: Jul. 17, 2001

(54) HYBRID HASH JOIN PROCESS

(75) Inventors: Lee-Chin Hsu Liu, Plymouth; Lowell L. Baerenwald, Eagan; James M. Plasek, Shoreview; Michael S. Jende, White Bear Lake, all of MN (US); Kenji Yoneda, Tokyo (JP)

(73) Assignee: Unisys Corporation, Blue Bell, PA (US)

( * ) Notice: Subject to any disclaimer, the term of this patent is extended or adjusted under 35 U.S.C. 154(b) by 0 days.

(21) Appl. No.: 09/135,313

(22) Filed: Jul. 30, 1998

(51) Int. Cl.[7] .................................................. G06F 17/00
(52) U.S. Cl. ....................................................... 707/4; 707/3
(58) Field of Search ............................ 707/3, 4, 5, 2–10, 707/100, 101, 103, 102, 200

(56) References Cited

U.S. PATENT DOCUMENTS 5,864,842 * 11/1999 Pederson et al. ......................... 707/2
5,878,427 * 3/1999 Waheed et al. ....................... 707/103
5,983,215 * 11/1999 Ross et al. .............................. 707/2

OTHER PUBLICATIONS

Blakeley et al., "Join Index, materialized view, and hybrid–hash join: a performance analysis", Data Enginneering, 1990, Proceedings 6th International Conference, pp. 256–263, Feb. 1990.*

Lo et al., "Towards eliminating random I/O in hash joins", Data Engineering, 1996, Proceedings of the 12th International Conference, Mar. 1996, pp. 422–429.*

Imai et al., "Performance analysis of parallel hash hoin algorithms on distributed shared memory machine implemenation and evaluation on HP exemplar SPP 1600", Data Engineering, 1998, 14th International Conference, pp. 76–85, Feb. 1998.*

* cited by examiner

Primary Examiner—Thomas G. Black
Assistant Examiner—David Jung
(74) Attorney, Agent, or Firm—Charles A. Johnson; Mark T. Starr

(57) ABSTRACT

A hybrid hash join process joins data rows from two tables which have at least one common data column by partitioning the data rows based on the values in the common data column(s), creating data structures to decrease search time for matching rows, and recovering full data buffers using a unique buffer management methodology. A smaller one of the two tables is designated as an outer table and a larger one of the two tables as an inner table. The hybrid hash join process determines which rows in the inner and outer tables satisfy a selection criteria; the rows that satisfy the selection criteria are referred to as inner hit rows and outer hit rows. The hybrid hash join process assigns the inner and outer hit rows to corresponding inner and outer partitions, respectively. Buffer overflow in the outer partitions is handled by linking empty buffers to the outer partitions until all buffers are used. Buffer space is recovered by writing outer hit rows for a selected partition to mass storage. Buffer overflow in the inner partitions is handled by either writing the inner rows in the buffer to mass storage or by searching the corresponding outer partition for matches. The outer hit rows in the corresponding outer partition are allocated to entries in a data structure which is then probed to find matches for the inner hit rows in the buffer. Matching outer hit rows for any inner hit rows written to mass storage are found by repeatedly reading into memory inner and outer hit rows and probing a data structure created from the memory-resident outer hit rows in a partition. Optionally, binary trees are built from the entries in the data structure to speed up the probing procedure. The hybrid hash join process uses at least one hashing algorithm to assign hit rows to partitions, to allocate rows to entries in the data structures, and to probe the data structures for matches.

29 Claims, 13 Drawing Sheets

HYBRID HASH JOIN PROCESS

FIELD OF THE INVENTION

The present invention is related to database systems and in particular to equijoin operations in relational database systems.

BACKGROUND OF THE INVENTION

In relational databases, records are stored as rows (tuples) within tables (relations), with each data field in a record represented as a column in the table. A join is a query operation that selects data from one or more tables using a single "select" operation that specifies values for certain column or columns. The specified values are often referred to as the "join attributes." The rows of data which result from the join operation are created by forming the Cartesian product of the specified tables and eliminating rows that do not meet the specified join selection criteria.

A join operation to retrieve rows from multiple tables is the most frequently used operation in a relational database system. It is also the most expensive in terms of computer processing and file input/output (I/O) time, especially when large tables are involved and the join operation is of an ad-hoc type, i.e., at least one of the tables is not keyed on the fields that define the join attributes. Ad-hoc join operations require fill table scans of the tables in order to find rows with join attributes that satisfy the selection criteria, a process which requires a large number of central processor cycles and file I/O's. Additionally, depending on the exact nature of the join operations, full table scans may have to be performed multiple times for a single query.

Join operations fall into two basic categories: an "equijoin" operation in which the selection criteria contains an equality condition, such as requiring a match on one or more columns common to two tables, as opposed to other join operations specify either less-than or greater-than conditions. In either case, the algorithm that performs the join operation must compare each row in one table with each row in every other table designated in the join operation. In a computer system with insufficient memory to hold all the tables in memory, a join operation becomes quite costly in terms of file I/O time. Equijoin operations are of particular focus for reducing processing costs as they are the most prevalent type of ad-hoc query issued against a relational database in a transactional environment.

Various algorithms have been developed to minimize the processing costs associated with join operations. Three major types currently in use are nested-loops, sort-merge, and hash-based. All of the existing algorithms in these categories have flaws, however.

In a nested loop, one of the tables is fully scanned to find a match for a row in a second table. Because the first table must be scanned once for each row in the second table, the nested loop incurs high file I/O unless some form of indexing is first performed on the tables. Even then, the indices must all fit into memory to realize significant I/O savings; otherwise the reduction in file I/O is minimal.

Sort-merge algorithms sort the tables on the join attribute (s) and then perform a merge function on the matching rows. A sort-merge algorithm is very efficient when the column defined as the selection criteria is used as a key for each of the tables, but otherwise requires multiple scans of the tables to find all the matching rows. Sorting operations are costly in terms of central processing cycles and in the number of file I/O's that must be performed.

Hash-based algorithms are driven by the fact that in the majority of join operations, only a few of the rows in the tables satisfy the selection criteria so that most of the comparisons of the nested-loop and sort-merge algorithms produce no results. This is particularly true in the case of equijoins where only exact matches are specified. In a basic hash join function, a mathematical function called a hash function or hashing algorithm partitions each relational table into multiple groups of rows based on the values stored in the column(s) specified as join attributes. Each group of rows is referred to as a "bucket." Because the same hashing algorithm is used on each table, rows containing identical join attribute values will be allocated into corresponding buckets. Thus, only the entries in a few buckets must be compared to find rows satisfying the selection criteria. Moreover, as one of the inputs into many hashing algorithms is the number of buckets required to hold all the rows in the largest table, the number of buckets is frequently chosen based on a bucket that is sized to fit within the available memory. Therefore, I/O costs can be further reduced. However, given the random distribution of column values in most cases, a hashing algorithm frequently results in few or no rows allocated to some buckets while too many rows to fit within a bucket are allocated to other buckets. Bucket overflow defeats the purpose of sizing a bucket to fit within memory and reduces the efficiency of a hash-based equijoin operation.

The GRACE algorithm implements the basic hash join function in a first phase but adds a second phase which uses the same hash-based algorithm to group the rows for each bucket associated with one of the relational tables into a "hash table." (Optionally, a different hashing algorithm is used to build the hash tables to alleviate problems with hash duplicates.) The GRACE algorithm then searches the hash tables using entries from a second relational table. The hash tables thus increase the efficiency of scanning the buckets for matches. The GRACE algorithm relies on a very large number of buckets to reduce the chance of bucket overflow but then combines buckets with few entries to create more optimally sized buckets ("bucket tuning"). However, bucket tuning destroys the relationship among the rows in the buckets and increases the amount of searching necessary to find matches.

Another variant on the basic hash join function, the hybrid hash join, is designed to deal with the problem of bucket overflow. The hybrid hash join algorithm retains the first bucket of each relational table in memory during a partitioning phase. All other buckets are written to disk. Because the same hash algorithm used to partition the buckets is also used to build the hash table during a joining phase, the hash table for each of the first buckets is already constructed at the end of the partitioning phase. Thus, fewer file I/O's are required and computation time to construct the hash tables is saved using the hybrid hash join function. However, to completely process the majority of join operations, some of the buckets that have been written to disk must be read into memory and have their hash tables built during the joining phase. Therefore, multiple passes of the second table are necessary, increasing processing time and file I/O's.

Still a third variation on the hash join function is the simple hash join which constructs a single bucket during each pass through one table. Rows which do not hash into the current bucket are either written back to disk or ignored. The current bucket is then probed by hit rows from a second table to find matches. If the non-hit rows in the first table are ignored, the number of file writes is significantly reduced. However, the number of file reads increases since several passes must be made through the first table before all the rows have been allocated to a bucket and probed.

Therefore, there is a need for a hash-based process, directed particularly to equijoin operations, that reduces minimizes processor and I/O costs beyond the reductions achievable by current hash-based functions.

SUMMARY OF THE INVENTION

A hybrid hash join process joins data rows from two tables which have at least one common data column by partitioning the data rows based on the values in the common data column(s), creating data structures to decrease search time for matching rows, and recovering full data buffers using a unique buffer management methodology. A smaller one of the two tables is designated as an outer table and a larger one of the two tables as an inner table. The hybrid hash join process determines which rows in the outer tables satisfy a selection criteria (outer hit rows) and assigns the outer hit rows to outer partitions based on the values of the common column in the rows. The outer hit rows are stored in outer buffers logically linked to the appropriate outer partition and when an outer buffer is filled, the hybrid hash join process links an empty buffer from a free buffer list to the partition. If no free buffer exists, the hybrid hash join process selects an outer partition, writes the outer hit rows in the outer buffers linked to the selected partition to mass storage, and links the now-empty outer buffers to the free buffer list. An outer partition with all its outer hit rows stored in buffers is an in-memory partition; an outer partition having some outer hit rows stored on mass storage is an in-file partition.

Once all the outer hit rows have been partitioned, the hybrid hash join process determines which rows in the inner tables satisfy the selection criteria (inner hit rows) and assigns the inner hit rows to inner partitions based on the values in the common column in the rows. There is a one-to-one correspondence between inner and outer partitions. The inner hit rows are stored in inner buffers logically linked to the appropriate inner partition. When an inner buffer is filled and the corresponding outer partition is an in-file outer partition, the hybrid hash operation writes all the inner hit rows in the full inner buffer to mass storage for later processing. When an inner buffer is filled and the corresponding outer partition is an in-memory outer partition, the hybrid hash operation searches the corresponding outer partition for matches between the inner hit rows in the full inner buffer and the outer hit rows in the outer partition. The search creates a data structure from any outer hit rows in the in-memory outer partition by allocating the outer hit rows to entries in the data structure based on the value of the common data column in the outer hit rows. The search probes the data structure for a matching outer hit row for each inner hit row in the full inner buffer using the value of the common column in the inner hit row, and retains any matching inner and outer hit rows for output as the result of the hybrid hash join process. The inner hit rows in the full inner buffer are discarded after the search.

When all the inner hit rows have been partitioned, the hybrid hash join process joins any partially filled inner buffers linked to inner partitions corresponding to in-memory outer partitions using the same process as for full inner buffers. The hybrid hash join process then joins outer hit rows from any in-file outer partitions with inner hit rows from the corresponding inner partitions. The hybrid hash join process searches each in-file outer partition for matches on the inner hit rows in the corresponding inner partition until all outer hit rows in the partition have been searched.

The search starts by reading outer hit rows from the in-file outer partition into memory. The number of outer rows read into memory at one time is based on a pre-determined amount of memory which is calculated to reserve room for a data structure to hold the outer hit rows and a pre-determined number of inner hit rows. The pre-determined number of inner hit rows is also read into memory. The outer hit rows are allocated to entries in the data structure based on the value of the common column in each outer hit row and the hybrid hash operation probes the data structure for matches using the value of the common data column for the inner hit row. Additional inner hit rows are read into memory, a number of pre-determined rows at a time, and the probe repeated. When all the inner hit rows have been read and probed, additional outer hit rows are read into memory, and the process repeats starting with the first pre-determined number of inner hit rows. Any matching inner and outer rows are retained to be output as a result of the hybrid join process.

Optionally, a binary tree is built for each entry in the data structures to improve the speed of the probing operations.

In one aspect of the hybrid hash join process, hashing algorithms are employed to partition the inner and outer tables, to allocate outer hit rows to entries in the data structures, and to determine which entry to probe for a match.

In another aspect of the hybrid hash join process, the allocation of outer hit rows to entries in the data structures is performed by a different computer processor than the probing of the data structures to speed the join operation. Further, in still another aspect of the invention, the searching of different partitions are assigned to different computer processors so that the joining of multiple partitions is performed in parallel.

A specific arrangement of code modules to perform the hybrid hash operation is also described.

The hybrid hash join process is designed to minimize processor time and file I/O when performing equijoin operations on two tables. When joining very large tables (on the order of 50 million rows) in which the join attributes are not indexed or keyed items and/or the selection criteria of the query prevents using any indices, the hybrid hash join process dramatically reduces the processor and file I/O costs of an equijoin operation. When the number of matches between the larger to smaller table varies between 1:3 to 1:20, the increase in performance can be a thousand-fold. In a computer configuration in which there is sufficient memory to hold the data structures for each outer partition in memory, the hybrid hash join process accomplishes the join operation with a single pass through the outer table rows, reducing the number of file I/O's to 2n (where n is the number of rows in the inner table) from approximately $n+n^2$ for a nested-loop join operation on the same data. Further reductions in execution time are achieved by performing portions of the process on different computer processors. Because equijoin operations are the most prevalent type of ad-hoc query issued against relational databases in a transactional environment, the hybrid hash join process of the present invention offers better performance than previous hash join functions.

DESCRIPTION OF THE EMBODIMENTS

In the following detailed description of the embodiments, reference is made to the accompanying drawings which form a part hereof, and in which is shown by way of illustration specific embodiments in which the invention may be practiced. These embodiments are described in sufficient detail to enable those skilled in the art to practice the invention, and it is to be understood that other embodiments may be utilized and that structural, logical and electrical changes may be made without departing from the spirit and scope of the present inventions. The following detailed description is, therefore, not to be taken in a limiting sense, and the scope of the present inventions is defined only by the appended claims.

The leading digit(s) of reference numbers appearing in the Figures corresponds to the Figure number, with the exception that the same reference number is used throughout to refer to an identical component which appears in multiple Figures. Signals and connections may be referred to by the same reference number or label, and the actual meaning will be clear from its use in the context of the description.

Hybrid Hash Join Process

Figure 9:
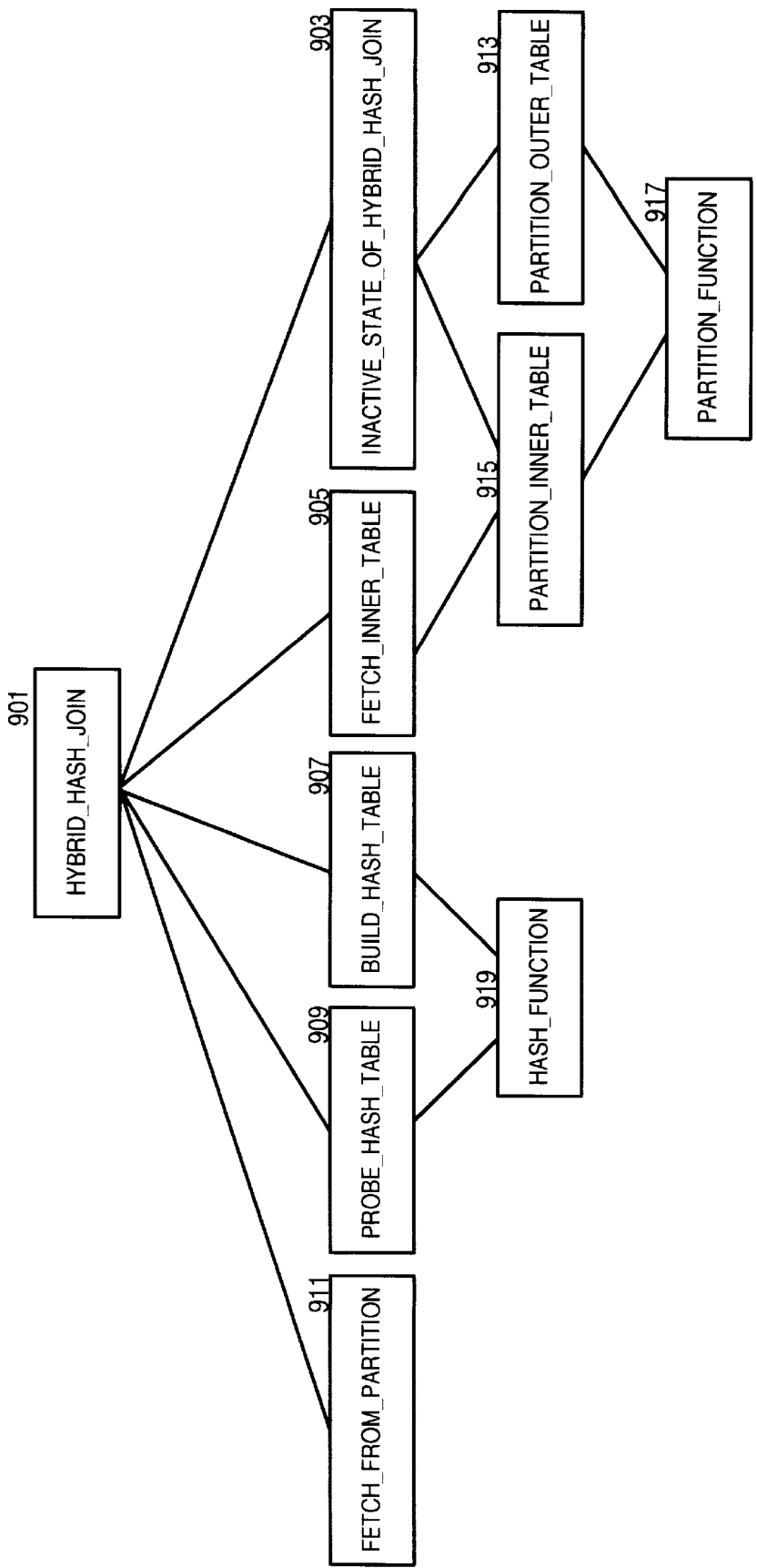
FIG. 9 is a block diagram illustrating code modules used by one embodiment of the invention.
Figure 10A:
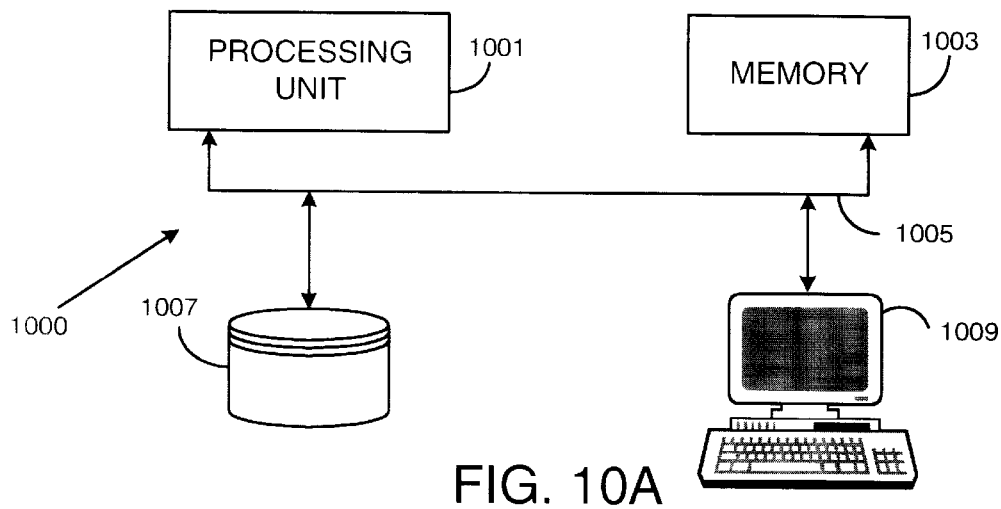
FIG. 10A, FIG. 10B, and FIG. 10C are illustrative block diagrams of operating environments suitable for practicing the invention.
Figure 10B:
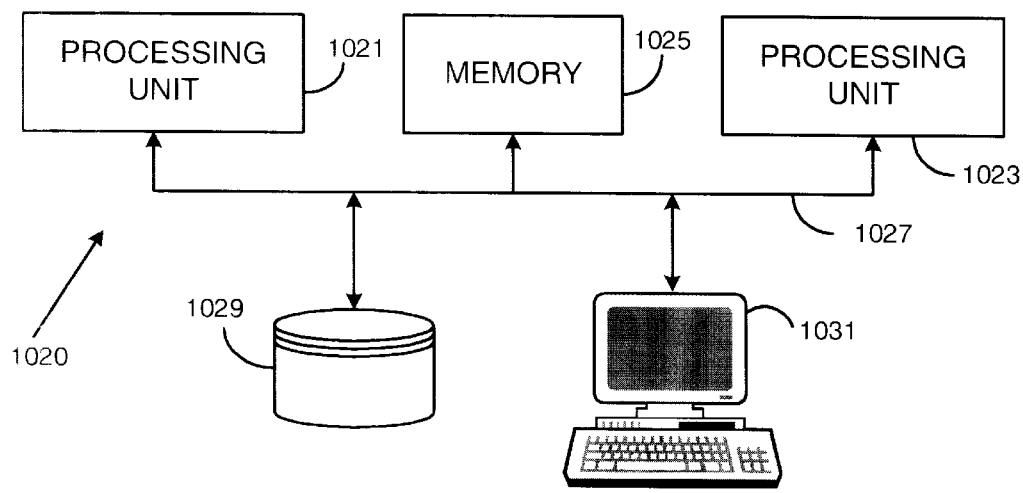
Figure 10C:
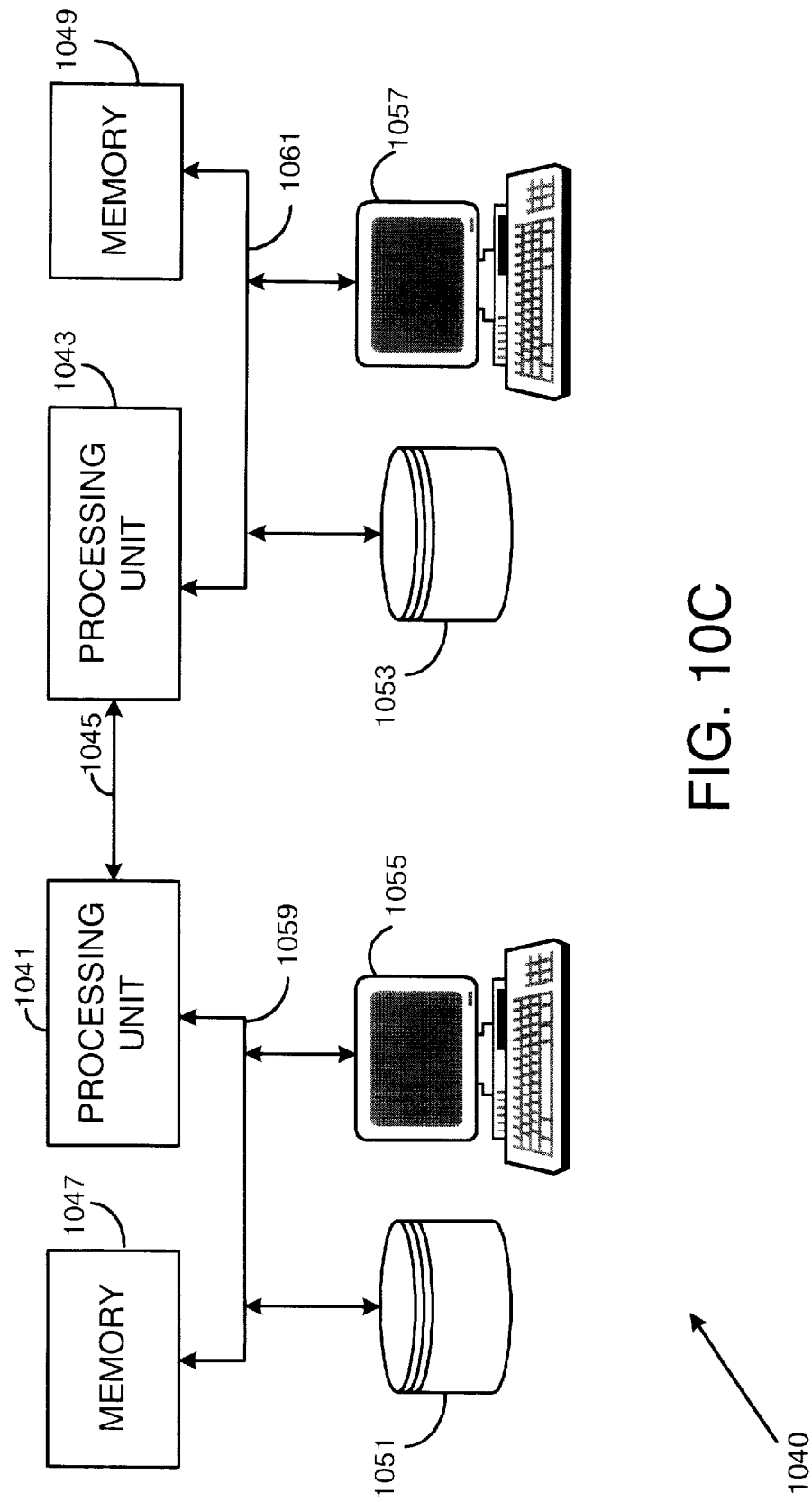

The following description of embodiments for a hybrid hash join process is in four sections: a conceptional overview, operations for the process (referring to FIGS. 1–5), logic flow (referring to FIGS. 6A, 6B, 6C, 7 and 8), code modules (referring to FIG. 9), and operating environments (referring to FIG. 10A, FIG. 10B and FIG. 10C.)

The embodiments of the hybrid hash join process are described using relational database terminology familiar to one of skill in the art. Therefore, records are termed "rows" having "columns" which represent data fields in the record. Related rows are stored in "tables." A join operation that utilizes the hybrid hash join process of the present invention outputs data from rows in two tables which having matching value(s) in column(s) common to the two tables.

Conceptional Overview

The hybrid hash join process returns data from two tables which have at least one common data column. The hybrid hash join process partitions the rows in the tables into groups ("partitions"), builds data structures to speed up the searching of the partitions, and "probes" the data structures for matches between the rows of the tables. The hybrid hash join process also manages data overflow in the partitions.

A smaller one of the two tables is designated as an outer table and a larger one of the two tables as an inner table. The hybrid hash join process determines which rows in the inner and outer tables satisfy a selection criteria. Such rows are called "hit" rows. The hybrid hash join process assigns the inner and outer hit rows to corresponding inner and outer partitions, respectively, based on the values of the common data column. The outer hit rows are partitioned first, followed by the inner hit rows. Rows are stored in buffers logically linked to the partitions.

Buffer overflow during partitioning of the outer table is handled by linking empty buffers to the outer partitions until all buffers are used. Buffer space is recovered by writing outer hit rows for a selected outer partition to mass storage, creating an "infile" outer partition. An outer partition with no rows stored on mass storage is an "inmemory" outer partition.

Buffer overflow during partitioning of the inner table is handled by writing the rows in the inner buffer to mass storage or by searching the corresponding outer partition for matches. A full inner buffer linked to an "in-file" inner partition, i.e. an inner partition corresponding to an in-file outer partition is written to mass storage and searches for matches after the partitioning of the inner table is complete. A full inner buffer linked to an "in-memory" inner partition, i.e., an inner partition corresponding to an in-memory outer partition, is searched for matches as described next.

The search creates a data structure from the outer hit rows in the corresponding in-memory outer partition to speed the searching. The outer hit rows are allocated to entries in the data structure based on the value of the common column(s) in the outer hit rows. The search uses the value of the common column in the inner hit row to probe the data structure for a matching outer hit row for each inner hit row in the full inner buffer. Any matching inner and outer hit rows are retained for output as the result of the hybrid hash join process. The inner hit rows in the full inner buffer are discarded after the search.

Because only full inner buffers linked to in-memory inner partitions are searched while the inner table is being partitioned, when the partitioning of the inner table is completed, the hybrid hash join process searches for outer hit rows that match inner hit rows in any partially filled buffers linked to in-memory inner partitions using data structures as described immediately above.

The hybrid hash join process then searches for outer hit rows that match any inner hit rows which are stored on mass storage or in inner buffers linked to in-file inner partitions. Because some of the outer hit rows in the corresponding in-file outer partitions are stored on mass storage, the hybrid hash join process reads outer hit rows from the in-file outer partition into memory until memory is filled to a pre-determined amount. A data structure is created from the outer hit rows in memory and probed for matches for all the inner hit rows in memory. An additional pre-determined number of inner hit rows are repeatedly read into memory, if necessary, until the data structure has been probed for all inner hit rows. The hybrid hash join process continues reading inner and outer hit rows into memory, creating data structures, and probing for matches until all outer hit rows have searched for all inner hit rows in the in-file inner partition. The hybrid hash join completes when all in-file inner partitions have been so processed.

Optionally, a binary tree is built for the each entry in the data structures created for the in-memory and in-file data partition to speed up the probes of those data structures for matches on inner hit rows.

The hybrid hash join process is described in detail below in terms of computer-executable logical processes that operate in a computer system having at least one processor, memory and mass storage. The processes can be implemented in software, hardware or firmware without departing from the scope of the invention. Any standard computer operating environment provides the underlying infrastructure of processing and file input/output (I/O) functions necessary for the execution of the invention. Furthermore, in a parallel computer, the processes can execute in parallel on multiple processors. Operating environments suitable for executing the hybrid hash join process are described below in conjunction with FIG. 10A, FIG. 10B, and FIG. 10C.

Operations

The operations of one embodiment of the hybrid hash join process is described next with reference to FIGS. 1–5. A first hashing algorithm is used to partition the inner and outer tables based on the values of the common column(s) in the hit rows. A second hashing algorithm further subdivides the hit rows in each outer partition, again based on the values of the common column(s). The second hashing algorithm is also applied to the value of the common column(s) of each inner hit row to determine which entry in the data structure to probe for a matching outer hit row. Hashing algorithms are well known mathematical functions used to covert a value or values into a number that determines which one of a plurality of groups the entity containing the value(s) is to be associated. The groups created by the first hashing algorithm are referred to as partitions, and the groups created by the second hashing algorithm are referred to as buckets to distinguish them from one another. Alternate embodiments in using a single hashing algorithm or more than two hashing algorithms will be readily apparent to one of skill in the art upon reading the following description.

Figure 1:
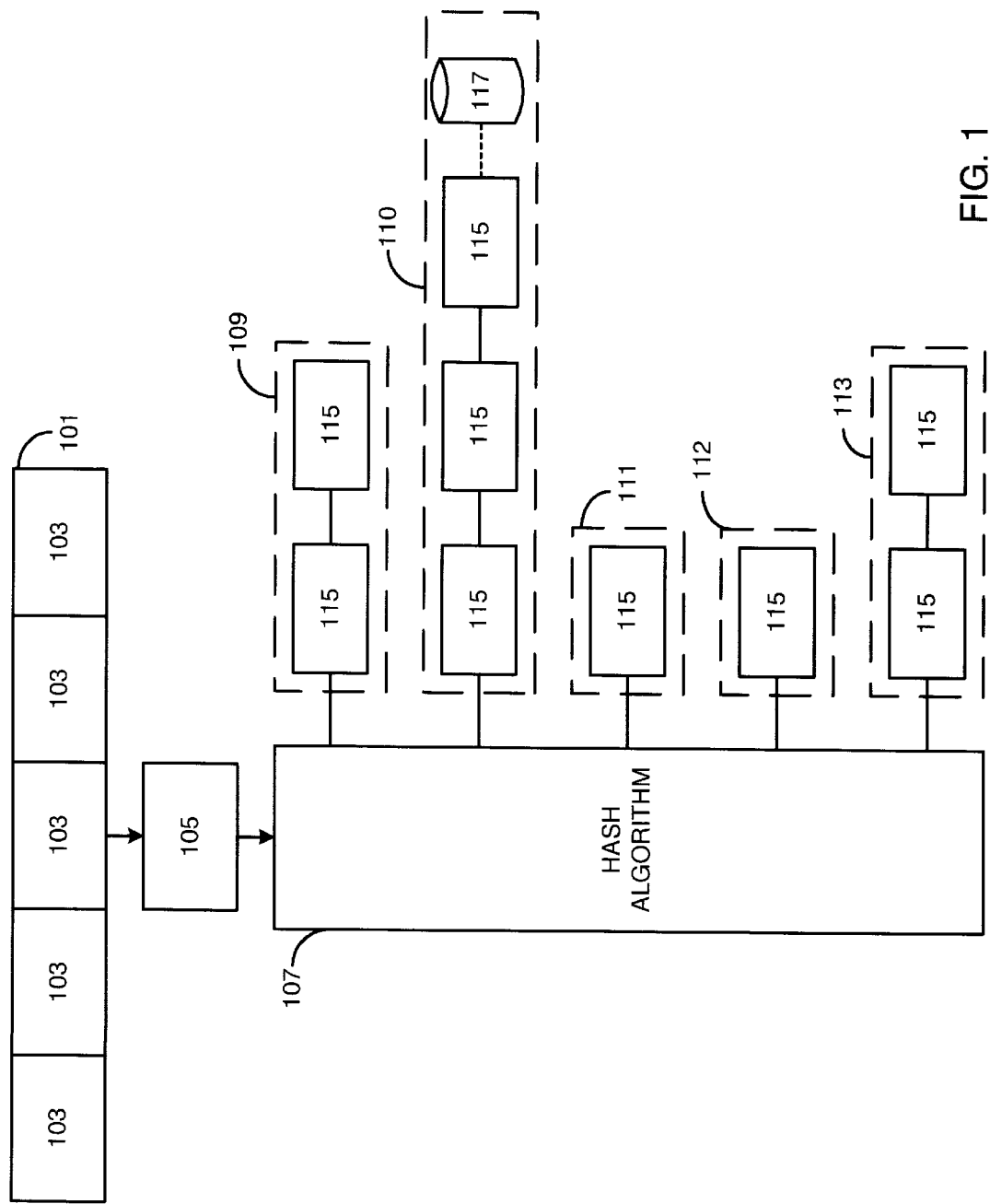
FIG. 1 is a block diagram illustrating partitioning of a relational database table in accordance with one embodiment of the invention.

FIG. 1 shows the smaller, or outer, table 101 of the two tables. Rows of the outer table 101 are shown as rows 103. Hit rows 105 that match a selection criteria are assigned to partitions 109–113 using a first hashing algorithm 107 on the common column(s) of the outer hit rows. Each hit row is stored in a memory-resident outer buffer 115 that is logically linked to the assigned partition 109–113.

To handle buffer overflow in outer buffers, either additional memory-resident buffers 115 are logically linked to the outer partitions, such as partitions 109 and 113, or the rows are written to a file 117 logically linked to the partition, as shown in partition 110. Buffer recovery for outer buffer overflow is described in more detail below in conjunction with FIGS. 6B and 6C. Partitions 109, 111–113 are called "in-memory" partitions because all of their rows are stored in memory-resident buffers; partition 110 is called an "in-file" partition because some of its rows are stored in file 117.

Figure 2:
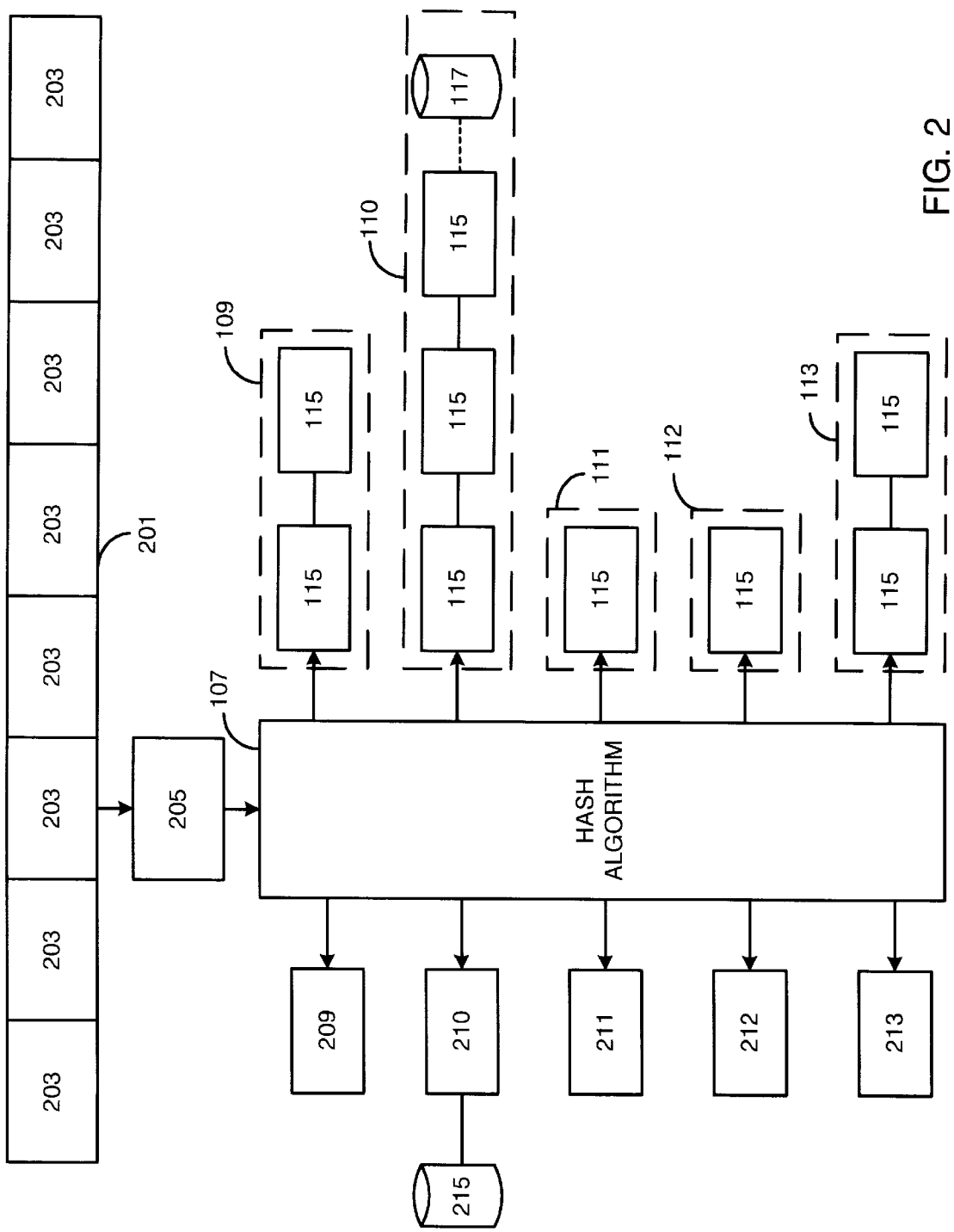
FIG. 2 is a block diagram illustrating partitioning of another relational database table.

After all the outer table rows are assigned to partitions 109–113, the hit rows 205 of the larger or inner table 201, are assigned to partitions 209–213 using the first hashing algorithm 107 on the common column(s) of the inner hit rows as shown in FIG. 2. Because the number of inner and outer partitions is equal and the hashing algorithm 107 is used to partition both the inner and outer tables, an inner hit row will be assigned to an inner partition that corresponds to the outer partition containing any outer hit row that matches on the common columns. For example, a row in outer table 101 that matches an inner table row assigned to partition 209 will be found in the corresponding outer partition 109.

Each partition 209–213 is assigned a single memory-resident inner buffer to hold its assigned inner table rows. Overflow in the inner buffers is handled in two ways and is explained using inner partitions 210 and 209 as examples.

In the case of inner partition 210, the corresponding outer partition is the in-file outer partition 110, and partition 210 is considered an "in-file" inner partition. The contents of a full inner buffer logically linked to an in-file inner partition are written to storage to recover the space in the full inner buffer, so the inner hit rows in inner partition 210 are written to a file 215 which is logically linked to partition 210.

Figure 3:
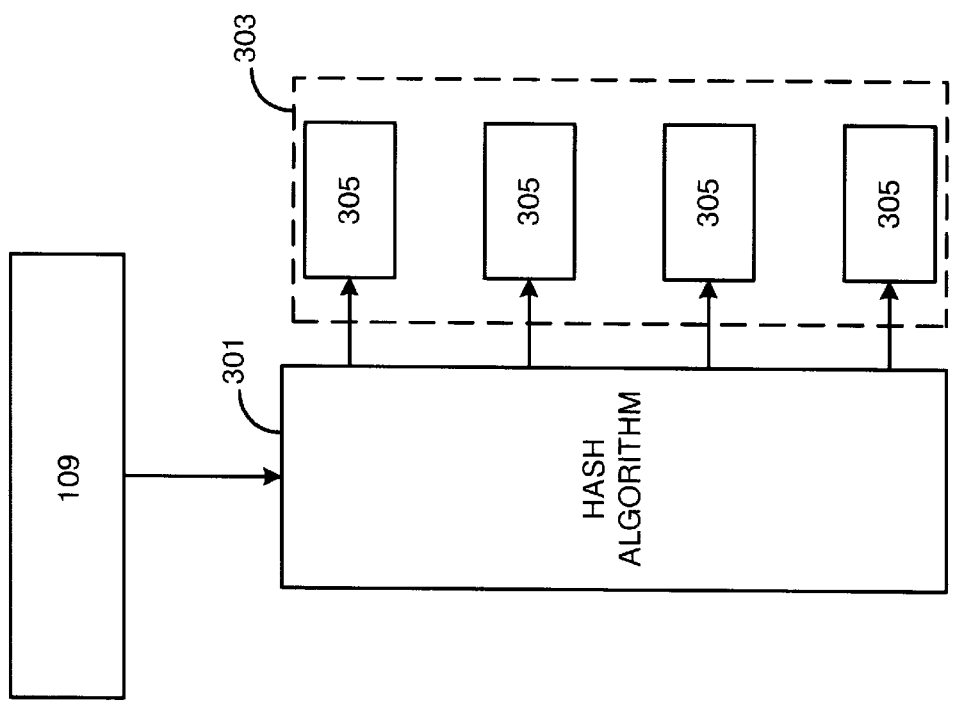
FIGS. 3 and 4 are block diagrams illustrating probing of a partitions of the relational database table of FIG. 1.
Figure 4:
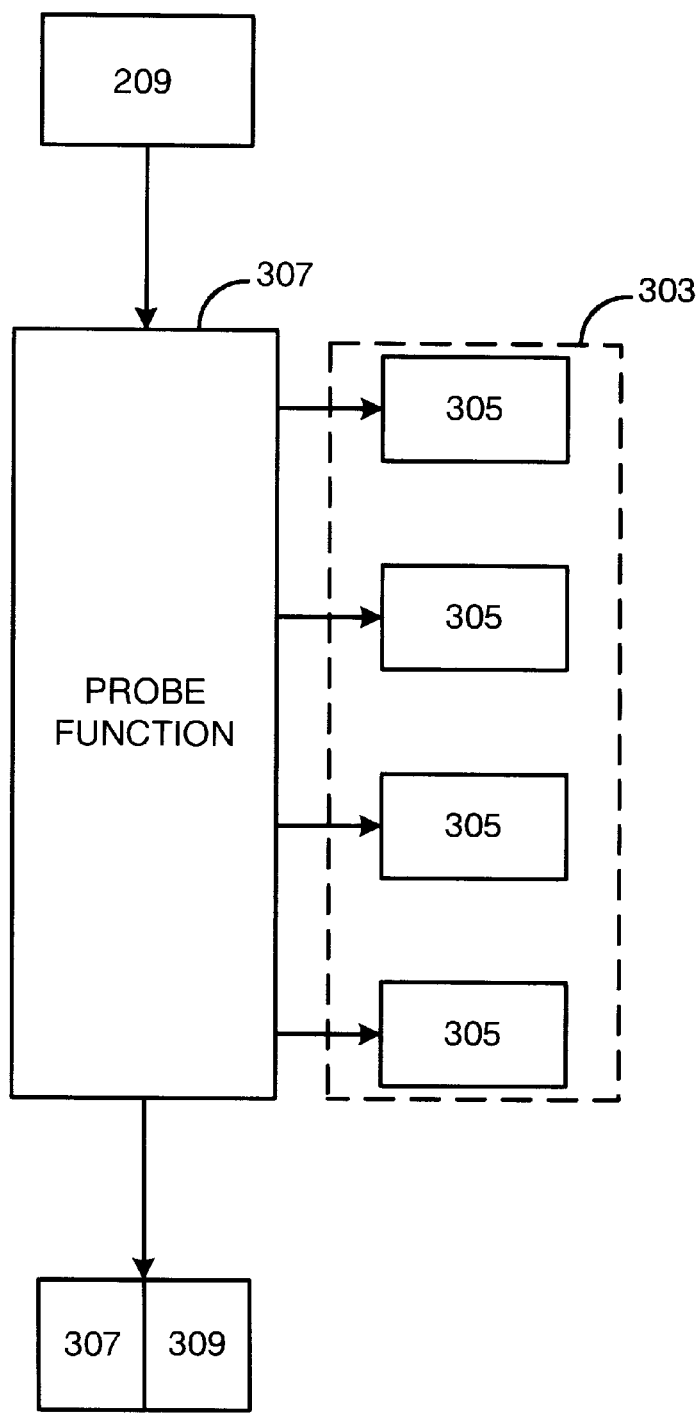

In the case of inner partition 209, the corresponding outer partition is the in-memory partition 109 (making inner partition 209 an "in-memory" inner partition) so the hybrid hash join process locates matching inner and outer rows in the partitions through a process known as "probing." The values of the common column(s) of the inner rows in the full inner buffer for inner partition 209 are compared with the values of the common column(s) of the outer rows in the corresponding in-memory outer partition 109 as illustrated in FIGS. 3 and 4.

Figure 5:
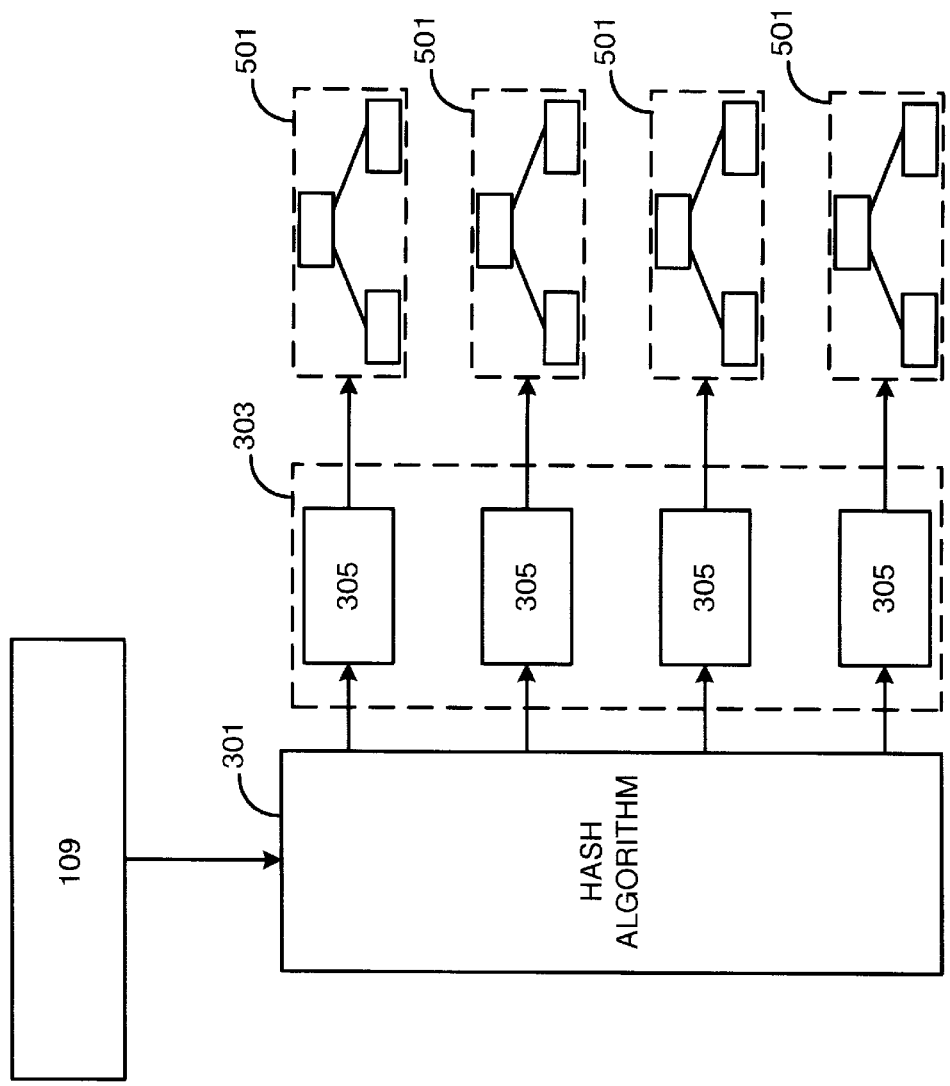
FIG. 5 is a block diagram illustrating binary trees built from a partition of the relational database table of FIG. 1.

The probing process begins by creating a data structure ("hash table") 303 of the outer hit rows in the outer partition 109 using a second hashing algorithm 301 on the common column(s). Each outer hit row is allocated to an bucket 305 (entry) in the hash table 303. The second hashing algorithm is also applied to the inner rows in the fill buffer of the inner partition 209 to determine which bucket 305 in the hash table would hold a matching outer row if one exists. A search of the appropriate bucket 305 for the outer partition is performed (probe function 307 in FIG. 4) and any matching inner 307 and outer 309 rows are returned as query output. In order to decrease the time necessary to search a bucket 305 for a matching outer row, FIG. 5 shows an embodiment in which a binary tree data structure 501 is built from the rows in each bucket 305 prior to beginning the matching operation illustrated in FIG. 4. Data structures are created and the probing process is also performed on any partially filled inner buffers and any in-file outer partitions when all inner rows have been partitioned as described briefly above and in further detail below.

The first and second hashing algorithms employed by the embodiment of the hybrid hash join process described above can be any of the widely known hashing algorithms used in relational database or other row storage technologies. One such well known hash function h is h(k)=k mod m where k is the data value to be hashed and m is a prime number. The hash function result h(k) is the remainder produced by dividing the value being hashed by the prime number. This hash function can be used for all the hashing algorithms employed by in the embodiments of the hybrid hash join process described herein by varying the value of m. Furthermore, the hash result can be scaled to an arbitrary integer range 0-r-1 using mod (h(k),r), where r is an integer that is smaller than m. Alternatively, any of the hashing algorithms can be a proprietary hash function that is optimized for performance on a particular computer configuration.

Logic Flow

Figure 6A:
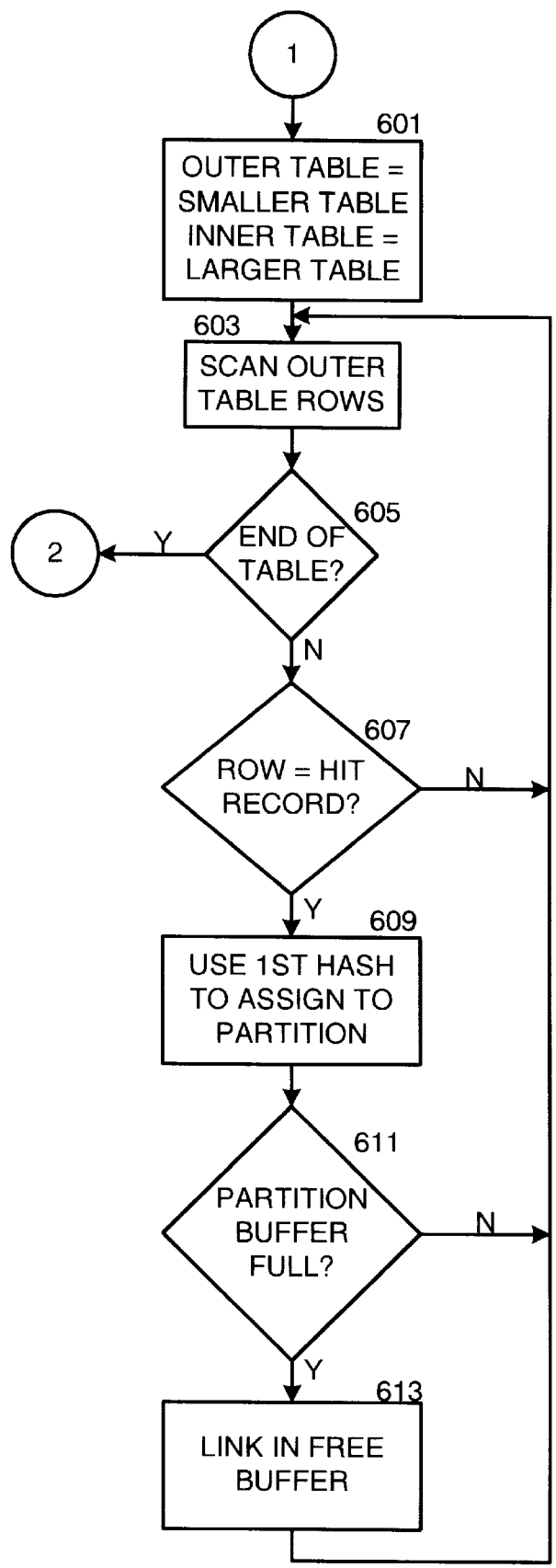
FIG. 6A is a logic flow diagram of a first phase in the operation of one embodiment of the invention.
Figure 6B:
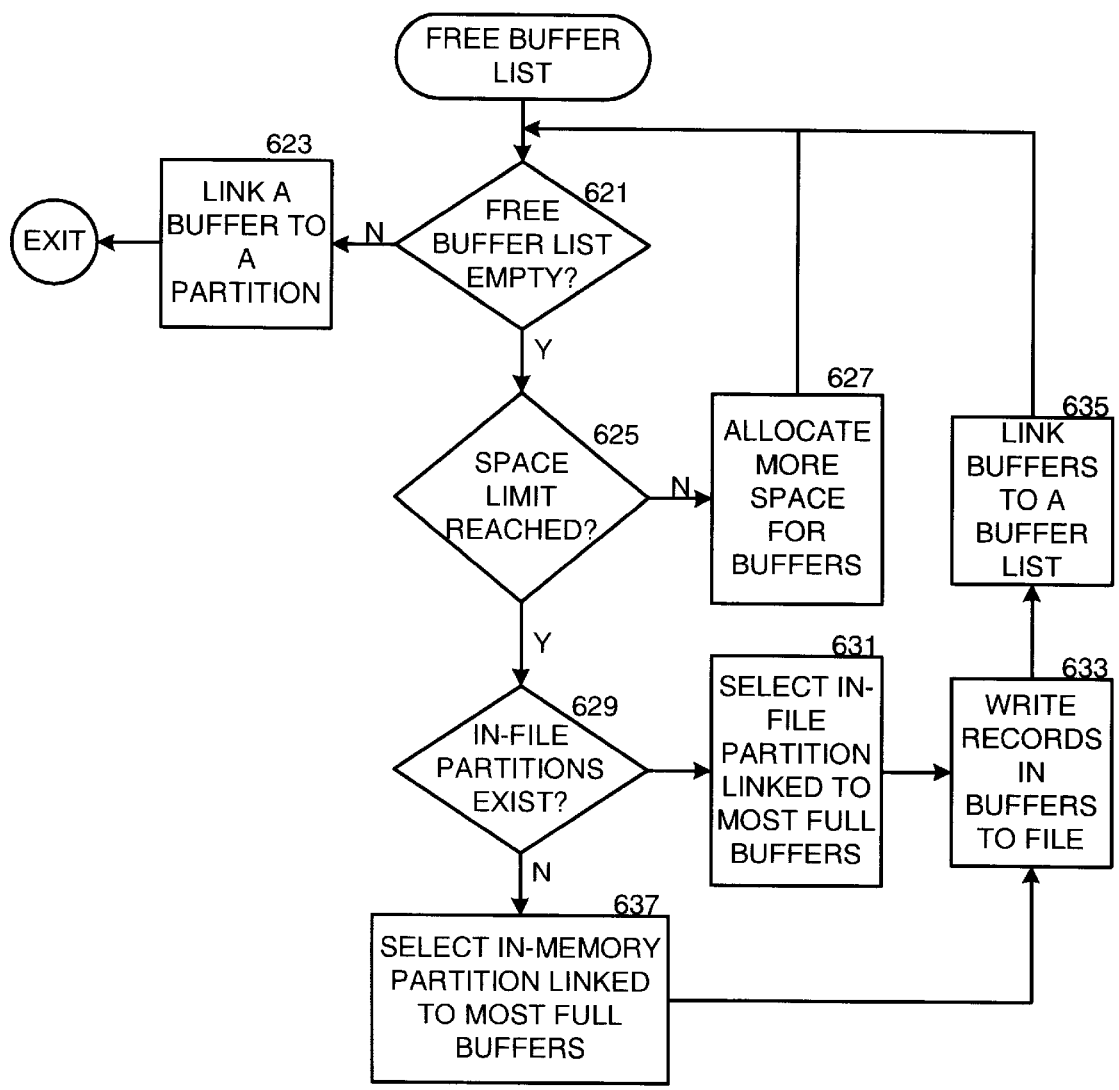
FIG. 6B is a logic flow diagram of a buffer allocation process in one embodiment of the invention.
Figure 6C:
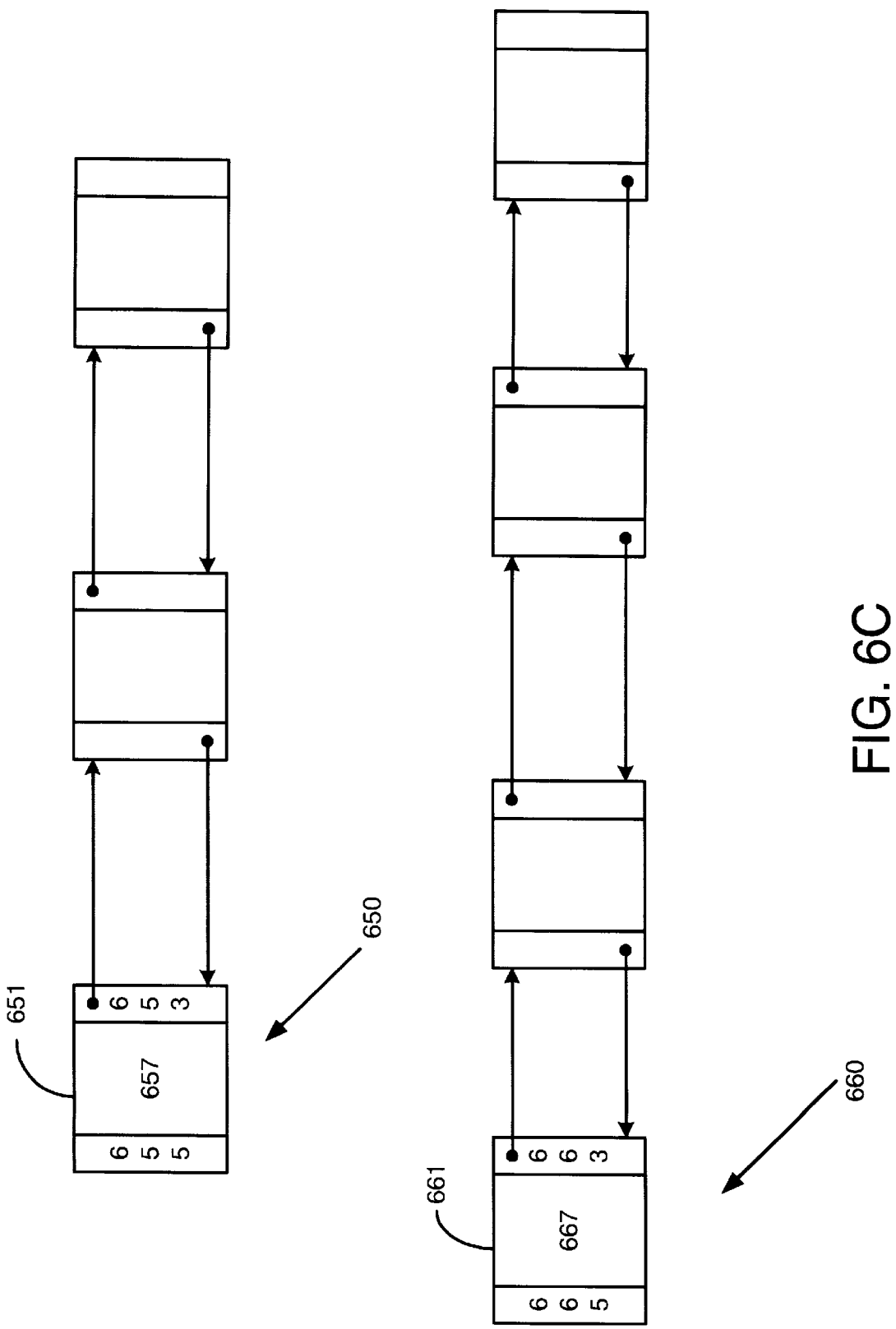
FIG. 6C is a block diagram of linked lists of partitions used in the buffer allocation process of FIG. 6B.
Figure 7:
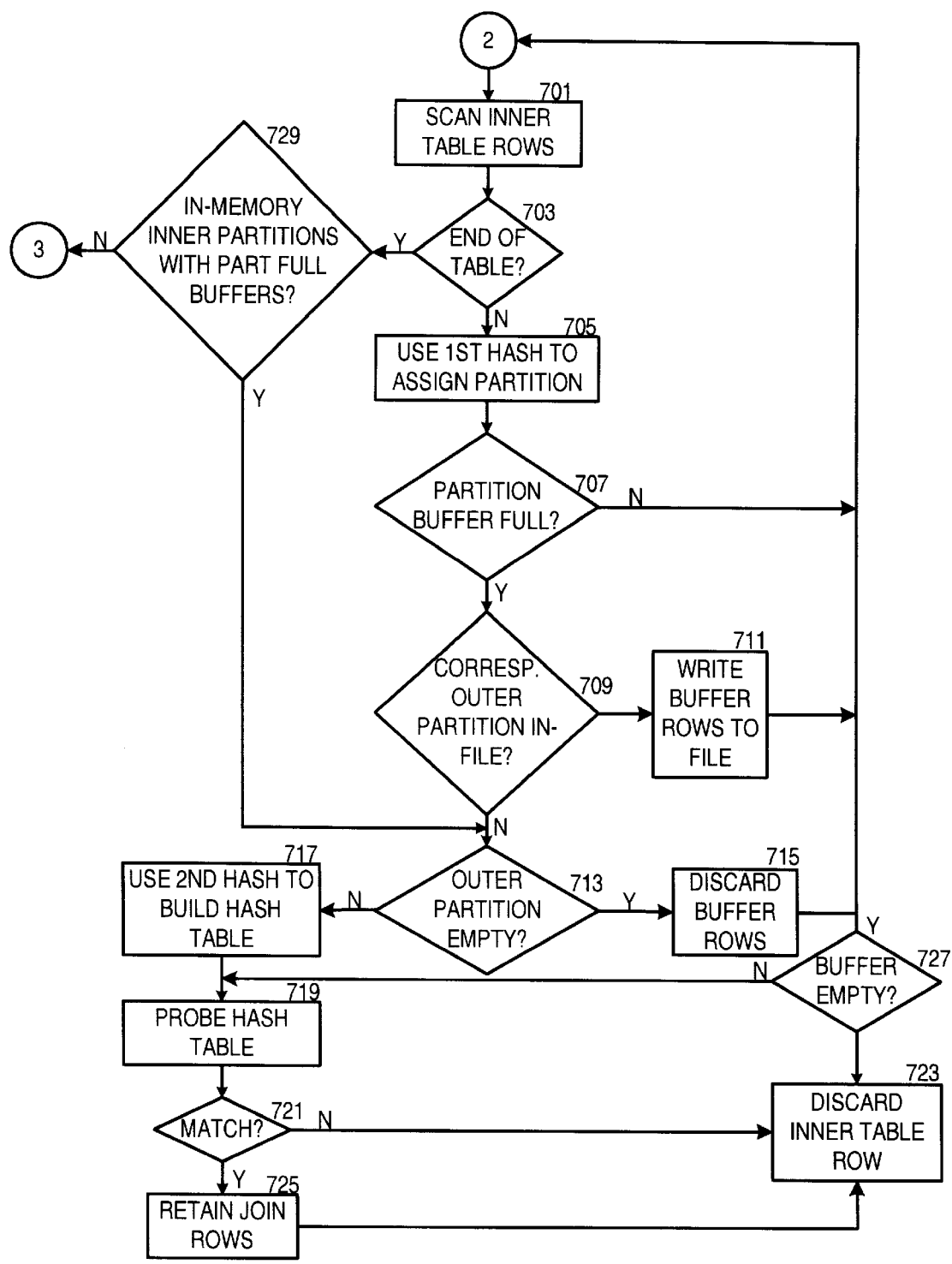
FIG. 7 is a logic flow diagram of a second phase in the operation of one embodiment of the invention.
Figure 8:
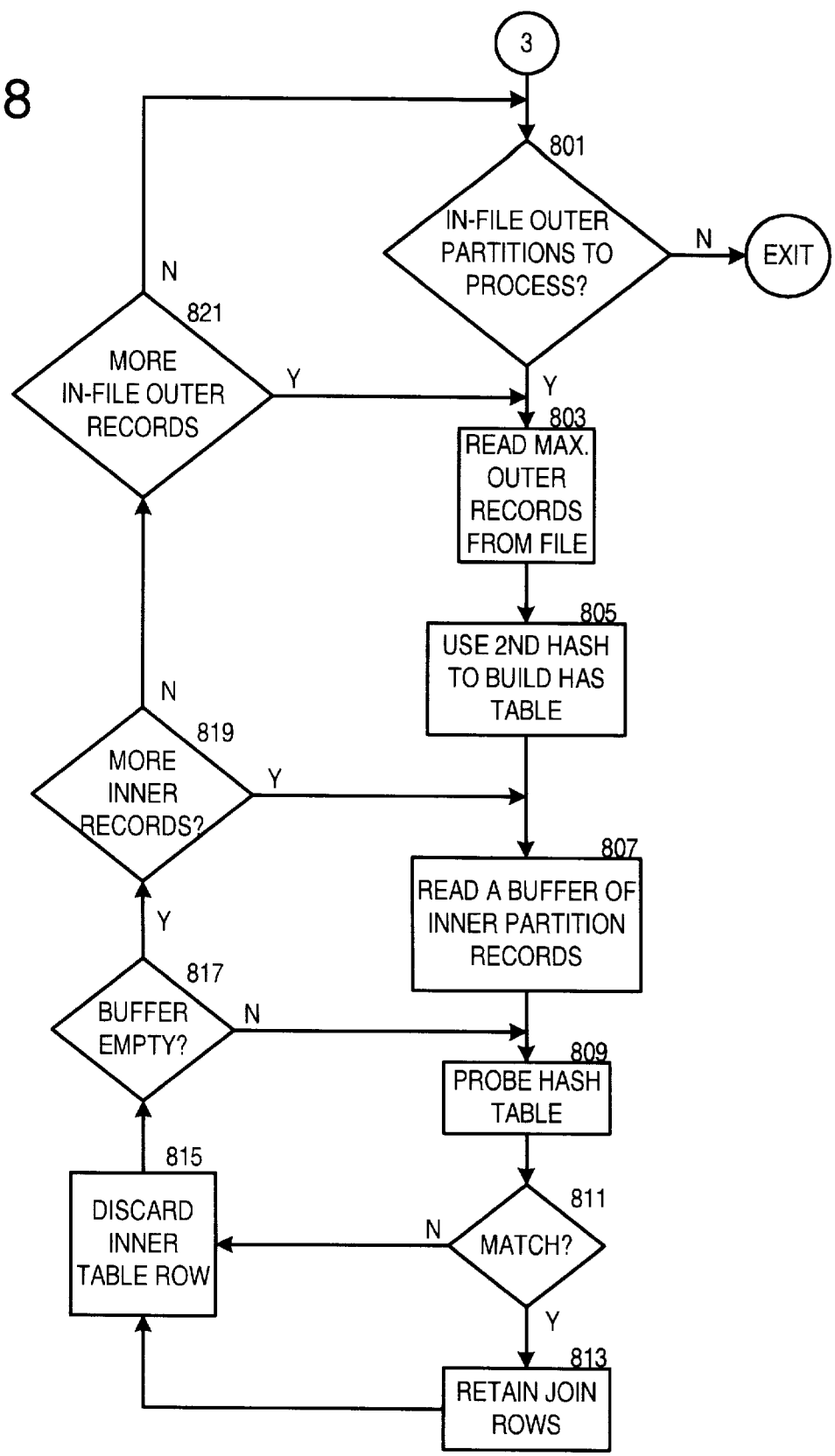
FIG. 8 is a logic flow diagrams of a third phase in the operation of one embodiment of the invention.

FIGS. 6A–B show logic flow for the outer table partitioning process (phase one) in the embodiment of the hybrid hash join process discussed above. FIG. 6C illustrates a linked list data structure used by the outer buffer recovery process during phase one. FIG. 7 shows logic flow for the inner table partitioning process and the searching process for in-memory outer partitions (phase two). FIG. 8 shows logic flow for the searching process for in-file outer partitions performed after the partitioning of the inner table when at least one in-file outer partition exists (phase three).

Phase One

In the first phase (FIG. 6A), the hybrid hash join process selects the smaller of the two tables as the outer table (step

601). The function then scans the outer table one row at a time to find hit rows (steps 603 and 607) and applies the first hashing algorithm to the common column(s) of each hit row (step 609). As each hit row is assigned to a partition, the hit row is inserted into the current memory-resident buffer lined to the assigned partition. If no buffer is linked to the partition, or if the linked buffer is full, a free buffer is linked to the partition at step 613. Details of step 613 are described in the next paragraph in conjunction with FIG. 6B. When all the rows in the outer table have been processed (step 605), the hybrid hash join process begins phase two.

As illustrated in FIG. 6B, a free buffer is chosen from a list of free buffers maintained by the hybrid hash function. If the list of free buffers is empty (step 621), the hybrid hash join process assigns additional space to the free buffer list (step 627) until a pre-determined limit is reached. When the limit is reached, the hybrid hash join process selects an outer partition (step 631 or 637), writes the rows in the outer buffers linked to the selected partition to a file (step 633), and returns the buffers to the free buffer list (step 635). One of the newly freed buffers is then linked to the outer partition needing a buffer (step 623). The outer partition that is selected for writing to a file is either the in-file outer partition with the greatest number of full buffers linked to it (step 631) or, if there are no in-file partitions (step 629), the in-memory outer partition having the greatest number of full buffers linked to it (step 637).

In order to speed up the selection process for recovering buffer space, one embodiment of the hybrid hash join process maintains two double linked lists of outer partitions as shown in FIG. 6C. List 650 links in-file partitions together; list 660 links in-memory partitions together. The partitions in both lists are sorted in ascending order based on the number of full buffers linked to the partition. Each entry 651 in list 650 and each entry 661 in list 660 contains at least three data items: a forward link item 653 and 663 which points to the list entry with the next greater number of full buffers, a backward link item 655 and 665 which point to the list entry with the next fewer number of full buffers, and a data item 657 and 667 that identifies the partition represented by the list entry. An entry 651 or 661 is created and linked into the list 650 or 660 as a partition is created. The forward links 653 and 663 and backward links 655 and 665 are broken and reconnected as the number of full buffers linked to the partitions changes with the addition of rows or when the buffers are emptied. Various linked list structures and management techniques well-known in the art are suitable for lists 650 and 660.

Phase Two

During the second phase shown in FIG. 7, the hybrid hash join process scans the rows in the inner table (step 701), applies the first hashing algorithm to the common column(s) of inner hit rows, and stores each inner hit row into the inner buffer linked to the appropriate inner partition (step 705). When an inner buffer linked to an inner partition is filled (step 707), the hybrid hash join process determines if the corresponding outer partition is an in-memory or in-file partition (step 709). An inner partitions is referred to as in-memory or in-file inner partition based on the corresponding outer partition.

If the corresponding outer partition is an in-file partition, the inner hit rows in the full inner buffer are written to a file for processing (step 711) during the third phase. If the corresponding outer partition is an in-memory partition, the hybrid hash join process determines if any outer hit rows are assigned to the outer partition (step 713). If the outer partition is empty, there are no matching hit rows in the outer table and the hit rows in the inner table buffer are discarded (step 715).

If the outer partition is not empty, the process uses the second hashing algorithm to build the hash table of the outer hit rows in the in-memory outer partition (step 717). The hybrid hash join process applies the second hashing algorithm to the common column(s) of each inner hit row in the full inner buffer. The process uses the output of the second hashing algorithm to determine the hash table bucket to which a matching outer hit row would be allocated and probes that bucket (step 719). If no match is found (step 721), the inner hit row in the buffer of the inner partition is discarded (step 723). Matching inner and outer hit rows are retained in memory for subsequent output (step 725) and the inner hit row in the buffer is discarded (step 723). The probing process continues until the inner buffer is empty (step 727). At that point, the hybrid hash join process resumes partitioning the inner table by scanning for hit rows (step 701).

In an alternate embodiment, the inner hit rows in the full inner buffer are discarded when all the outer hit rows have been searched for each inner hit row.

In an alternate embodiment, step 717 also builds the binary tree for each bucket in the hash table using the values of the common column(s) of each of the hit rows in the bucket. In this alternate embodiment, step 719 uses the binary trees when probing the hash table for matches. The binary trees speed the searching process.

When all the hit rows of the inner table have been assigned to partitions (step 703), the hybrid hash join process determines if there are any partially filled inner buffers linked to in-memory inner partitions (step 729). If so, the hybrid hash join process executes steps 713 through 727, as described immediately above, for each partially filled inner buffer. The hybrid hash join process then determines if there are any in-file outer partitions (step 801 in FIG. 8). If there are no in-file outer partitions, the hybrid hash join process is complete. Otherwise, the third phase executes a loop hash join algorithm to process the in-file hit rows.

Phase Three

As many hit rows from an in-file outer partition as will fit into a pre-determined amount of memory are read into memory (step 803) and a hash table for the outer hit rows in memory is built using the second hashing algorithm (step 805). One buffer's worth of inner hit rows from the corresponding in-file inner partition is read into memory (step 807), if necessary, and used to probe the outer partition for matching hit rows using the second hashing algorithm (step 809). Matching hit rows are retained in memory for subsequent output (step 813). When all the rows in the current buffer have been processed (step 817), another buffer's worth of hit rows from the inner partition is read into memory (step 807). When all the hit rows in the inner partition have been processed (step 819), another group of outer hit rows are read into memory (step 803) if any outer hit rows in the current in-file outer partition remain to be probed. The loop hash join algorithm is repeated until all the hit rows in the current in-file outer partition have been probed for matches for all the inner hit rows in the corresponding in-file inner partition (step 821). The third phase terminates when all in-file outer partitions have been processed (step 801).

Code Modules

One skilled in the art will readily perceive that the processes illustrated in FIGS. 6A, 6B, 7 and 8 can be implemented using various software programming paradigms with the functions described above assigned among different code modules, and that the code modules can be different types, such as procedures, subroutines, objects, or the like. FIG. 9 is a block diagram that shows the interrelationship between such code modules in one embodiment of the invention.

Module hybrid_hash_join 901 returns a hit row that satisfies the selection criteria specified for an equijoin operation. When first invoked, hybrid_hash_join 901 calls module inactive_state_of_hybrid_hash_join 903 to partition the outer table using the first hashing algorithm. Inactive_state_of_hybrid_hash_join 903 also returns the first full buffer of hit rows for an inner table partition that corresponds to an in-memory outer table partition. Subsequent full buffers of inner hit rows corresponding to in-memory outer partitions are returned by calling module fetch_inner_table 905. (The modules called by inactive_state_of_hybrid_hash_join 903 and fetch_inner_table 905 are described further below.) For the first full inner buffer returned, hybrid_hash_join 901 calls module build_hash_table 907 to build the hash table for the corresponding outer table partition. For each full buffer of inner hit rows, the module probe_hash_table 909 is called to find the matching outer table row(s) for each inner table row in the buffer. Both build_hash_table 907 and probe_hash_table 909 call module hash_function 919 to invoke the second hashing algorithm. If there are any partially filled inner buffers linked to in-memory inner partitions when the inner rows have all been partitioned, hybrid_hash_join 901 calls the modules build_hash_table 907 and probe_hash_table 909 to search for matches for the inner rows in each partially filled inner buffer.

Once all the inner table hit rows in in-memory inner partitions have been processed, hybrid_hash_join 901 calls module fetch_from_partition 911 to process any in-file inner partitions. Fetch_from_partition 911 first reads into memory a buffer's worth of inner table hit rows from disk, and then reads as many of the hit rows in the corresponding in-file outer table partition as will fit into the available memory remaining after reading in the inner table hit rows. Hybrid_hash_join 901 then calls build_hash_table 907 and probe_hash_table 909 to find matching rows until the all the inner rows in the partition have been processed. Fetch_from_partition 911 is invoked as many times as necessary to process all the hit rows in all the in-file outer partitions.

Module inactive_state_of_hybrid_hash_join 903 invokes module partition_outer_table 913 to build an outer partition when a hit row is found in the outer table. Partition_outer_table 913 calls module partition_function 917 to generate a partition number for the hit row and to store the hit row in a buffer linked to the outer partition identified by the number. When a buffer is filled, partition_outer_table 913 assigns a buffer from a free buffer list, as described in more detail below, and logically links the empty buffer into the partition's buffer chain.

When all the hit rows of the outer table have been partitioned, inactive_state of_hybrid_hash_join 903 invokes module partition_inner_table 915 to partition the hit rows of the inner table and to return a full buffer of hit rows from an inner partition. Partition_inner_table 915 calls module partition_function 917 to generate a partition number for a hit row and to store the hit row in the buffer linked to the inner partition identified by the number. When a buffer is filled, partition_inner_table 915 returns the partition number of the corresponding outer partition if the outer table partition is an in-memory partition. If the outer table partition is an in-file partition, partition_inner_table 915 writes the hit rows in the full buffer to a file.

In the embodiments described above, when overflow occurs in a buffer linked to an outer partition, the hybrid hash join process logically links a free buffer into the partition's chain of buffers. The process of acquiring a free buffer is performed by module partition_outer_table 913 and is part of step 613 shown in FIG. 6A and detailed in 6B.

Operating Environments

FIG. 10A, FIG. 10B, and FIG. 10C show three operating environments suitable for practicing the merge join process. In FIG. 10A computer 1000 has a single processing unit 1001 coupled to a memory 1003 through a system bus 1005. Memory 1003 is representative of all types of memory devices standard in a computer system, such as cache memory, ROM, and system RAM. A storage device 1007 is coupled to the system bus 1005 to store and access computer programs and data on computer-readable media. The media for storage device 1007 can be fixed, such as a hard disk, or removable, such as tape. A display device 1009 is also connected to the system bus 1005. As will be readily apparent to one skilled in the art, the processes of hybrid hash join process described above execute within the processing unit 1001 from the computer-readable media of storage device 1007. Hit rows assigned to in-file inner and outer partitions are stored on storage device 1007 while hit rows assigned to in-memory inner and outer partitions are stored in memory 1003.

In FIG. 10B computer 1020 is a multi-processor system having two processing units 1021, 1023 coupled to a shared memory 1025 through a system bus 1027. The processing units 1021, 1023 also share a common storage device 1029. In FIG. 10C computer 1040 is also a multi-processor system having two processing units 1041, 1043 which are coupled through a communications bus 1045. Communications bus 1045 can be an high-speed system bus, a network bus, or the like. Each processing unit 1041, 1043 is coupled to non-shared devices, such as memory 1047, 1049 and storage 1051, 1053, through an non-shared system bus 1059, 1061. Multi-processor systems having more than two processing units are well-known in the art and are appropriate operating environments for the present invention.

The hybrid hash join process of the present invention is structurally suited for execution on multi-processor systems In one alternate embodiment, the hash table construction and probing procedures, such as illustrated in FIG. 7, for each pair of corresponding partitions is executed by a different processor so that the joining of multiple partitions is performed in parallel. The join results of all the processors is then combined for output to the user. While processor costs are not further reduced by parallel operation of the hybrid hash join process, the execution time of the query decreases. Additional embodiments of the merge join process suitable for parallel processing will be apparent to one skilled in the art and are within the scope of the invention.

Conclusion

The hybrid hash join process described above offers better performance than previous hash join functions for multiple reasons. First, it retains multiple partitions in memory, rather than just the first one as in the prior art hybrid hash join algorithm, which reduces the number of file I/O's. Second, bucket tuning is not performed as in the prior art GRACE hash algorithm so that the relationship between hit rows in the outer partitions and hit rows in the inner partitions is preserved, making the matching process simpler to implement. Third, when all the hit rows in the smaller, outer table fit into memory, only a single pass of the inner and outer tables is necessary, saving file I/O and processor cycles. Fourth, even when all the hit rows in the outer table cannot fit into memory and multiple passes through the tables are necessary, the loop hash join algorithm used in the third phase minimizes the swapping of rows in and out of memory. Fifth, use of the optional binary tree structure for the hash table buckets created by the second algorithm speeds up the matching process. Sixth, the operations of the hybrid hash join process can be executed in parallel using multiple computer processors, further reducing the elapsed time between submission of the join operation and the presentation of the results.

It is to be understood that the above description is intended to be illustrative, and not restrictive. Many other embodiments will be apparent to those of skill in the art upon reviewing the above description. The scope of the invention should, therefore, be determined with reference to the appended claims, along with the full scope of equivalents to which such claims are entitled.

What is claimed is:

1. In a computer system having memory, mass storage and at least one processor, a method for joining data rows from two tables which have a common data column, where a smaller one of the two tables is designated as an outer table and a larger one of the two tables as an inner table, the method comprising the steps of:
partitioning outer hit rows into a plurality of outer partitions, wherein an outer hit row is a row in the outer table that satisfies a selection criteria, the partitioning of the outer hit rows comprising the steps of:
assigning each outer hit row to an outer partition based on the value of the common column in the outer hit row; and
storing each outer hit row in an outer buffer logically linked to the assigned outer partition; and
joining outer hit rows from the outer partitions with inner hit rows, wherein an inner hit row is a row in the inner table that satisfies the selection criteria, the joining of outer hit rows from each outer partition and the inner hit rows comprising the step of:
partitioning the inner hit rows into a plurality of inner partitions so that there is a one-to-one correspondence between the inner and outer partitions, the partitioning of the inner hit rows comprising the steps of:
assigning each inner hit row to an inner partition based on the value of the common column in the inner hit row;
storing each inner hit row in an inner buffer logically linked to the assigned inner partition; and
searching an outer partition when the inner buffer linked to the corresponding inner partition is filled, the searching of an outer partition comprising the steps of:
allocating each outer hit row assigned to the outer partition to one of a plurality of entries in a data structure based on the value of the common column of the outer hit row;
probing the data structure for a matching outer hit row for each inner hit row in the full inner buffer, wherein the value of the common column in an inner hit row identifies the entry in the data structure to probe for the matching outer hit row; and
retaining any matching inner and outer hit rows to be output as a result of the joining of the data rows.

2. The method of claim 1, wherein the assignment of an outer hit row to an outer partition, the assignment of an inner hit row to an inner partition, and the allocation of an outer hit row to a data structure entry is determined by use of a hashing algorithm.

3. The method of claim 1, wherein the assignment of an outer hit row to an outer partition and the assignment of an inner hit row to an inner partition is determined by use of a first hashing algorithm, and the allocation of an outer hit row to a data structure entry is determined by use of a second hashing algorithm.

4. The method of claim 1, wherein the assignment of an outer hit row to an outer partition is determined by use of a first hashing algorithm and the assignment of an inner hit row to an inner partition is determined by use of a second hashing algorithm that produces the one-to-one correspondence between the inner and outer partitions.

5. The method of claim 1, wherein the step of searching an outer partition further comprises the step of creating a binary tree for each entry in the data structure keyed on the common column of the outer hit rows, and wherein the step of probing the data structure for a matching outer hit row utilizes the binary tree for the identified entry.

6. The method of claim 1, further comprising the steps of:
discarding the inner hit rows in a full inner buffer when the corresponding outer partition is empty; and
discarding each inner hit row in a full inner buffer when the corresponding outer partition has been searched.

7. In a computer system having memory, mass storage and at least one processor, a method for joining data rows from two tables which have a common data column, where a smaller one of the two tables is designated as an outer table and a larger one of the two tables as an inner table, the method comprising the steps of:
partitioning outer hit rows into a plurality of outer partitions, wherein an outer hit row is a row in the outer table that satisfies a selection criteria, the partitioning of the outer hit row comprising the steps of:
assigning each outer hit row to a partition based on the value of the common column in the outer hit row;
storing each outer hit row in an outer buffer logically linked to the assigned outer partition;
linking an empty buffer from a free buffer list to an outer partition when an outer buffer already linked to the partition is filled; and
recovering buffer space when the free buffer list is empty comprising the steps of:
selecting an outer partition;
writing the outer hit rows in the outer buffers linked to the selected partition to mass storage, whereby an in-memory outer partition has no outer hit rows stored on mass storage and an in-file outer partition has outer hit rows stored on mass storage; and
linking the outer buffers linked to the selected partition to the free buffer list;
joining outer hit rows from the in-memory outer partitions with inner hit rows when all outer hit rows have been partitioned, wherein an inner hit row is a row in the inner table that satisfies the selection criteria, the joining of the outer hit rows from in-memory outer partitions with inner hit rows comprising the steps of:
partitioning the inner hit rows into a plurality of inner partitions so that there is a one-to-one correspondence between inner and outer partitions, wherein an inner partition corresponding to an in-memory outer partition is an in-memory inner partition and an inner partition corresponding to an in-file outer partition is an in-file inner partition, the partitioning of the inner hit rows comprising the steps of:
assigning each inner hit row to an inner partition based on the value of the common column in the inner hit row;

storing each inner hit row in an inner buffer logically linked to the assigned inner partition; and recovering buffer space when a inner buffer is filled comprising the steps of:

writing, to mass storage, the inner hit rows in a full inner buffer linked to an in-file inner partition;

searching the corresponding in-memory outer partition for a match on each inner hit row in a full buffer linked to an in-memory inner partition, the searching of the corresponding in-memory outer partition for the full buffer comprising the steps of:

allocating each outer hit row assigned to the corresponding in-memory outer partition to one of a plurality of entries in a data structure based on the value of the common column of the outer hit row;

probing the data structure for a matching outer hit row for each inner hit row in the full inner buffer, wherein the value of the common column in an inner hit row identifies the entry in the data structure to probe for the match for the inner hit row; and retaining any matching inner and outer hit rows to be output as a result of the joining of the data rows; and discarding the inner hit rows in a full buffer linked to an in-memory inner partition when the corresponding in-memory outer partition has been searched; and searching the corresponding in-memory outer partitions for a match on each inner hit row in any partially filled buffers linked to in-memory inner when all the inner rows have been partitioned, the searching of the corresponding in-memory outer partition for each partially filled buffer comprising the steps of:

allocating each outer hit row assigned to the corresponding in-memory outer partition to one of a plurality of entries in a data structure based on the value of the common column of the outer hit row;

probing the data structure for a matching outer hit row for each inner hit row in the partially filled inner buffer, wherein the value of the common column in an inner hit row identifies the entry in the data structure to probe for the match for the inner hit row; and retaining any matching inner and outer hit rows to be output as a result of the joining of the data rows; and joining outer hit rows from the corresponding in-file outer partitions with the inner hit rows from any in-file inner partitions when all the inner hit rows have been partitioned, the joining of the outer hit rows from each corresponding in-file outer partition with the inner hit rows comprising the steps of:

reading into memory the outer hit rows from the corresponding in-file outer partition; and searching the outer hit rows in memory for a match on each inner hit row assigned to the in-file inner partition, the searching of the corresponding in-file outer partition for each inner hit row comprising the steps of:

allocating each outer hit row in memory to one of a plurality of entries in a data structure based on the value of the common column of the outer hit row;

probing the data structure for a matching outer hit row for the inner hit row, wherein the value of the common column in an inner hit row identifies the entry in the data structure to probe for the matching outer hit row; and retaining any matching inner and outer hit rows to be output as a result of the joining of the data rows.

8. The method of claim 7, wherein the assignment of an outer hit row to an outer partition, the assignment of an inner hit row to an inner partition, and the allocation of an outer hit row to a data structure entry is determined by use of a hashing algorithm.

9. The method of claim 7, wherein the assignment of an outer hit row to an outer partition and the assignment of an inner hit row to an inner partition is determined by use of a first hashing algorithm, and the allocation of an outer hit row to a data structure entry is determined by use of a second hashing algorithm.

10. The method of claim 7, wherein the assignment of an outer hit row to an outer partition is determined by use of a first hashing algorithm and the assignment of an inner hit row to an inner partition is determined by use of a second hashing algorithm that produces the one-to-one correspondence between the inner and outer partitions.

11. The method of claim 7, wherein the steps of searching the corresponding in-memory outer partition for the fall buffer, searching the corresponding in-memory outer partition for each partially filled buffer, and searching the outer hit rows in memory, further comprise the step of creating a binary tree for each entry in the data structure keyed on the common column of the outer hit rows, and wherein the step of probing the data structure for a matching outer hit row utilizes the binary tree for the identified entry.

12. The method of claim 7, further comprising the step of:

discarding the rows in a full inner buffer when the corresponding outer partition is empty.

13. The method of claim 7, wherein the step of reading into memory the outer hit rows reads as many outer hit rows as will fit into a pre-determined amount of memory, and the steps of reading and searching are repeated until all outer hit rows have been read into memory and searched for each inner hit row assigned to the in-file inner partition.

14. The method of claim 4, wherein the pre-determined amount of memory filled by outer hit rows from an in-file outer partition is chosen to permit a data structure for the in memory outer hit row and a pre-determined number of inner hit rows to fit into memory.

15. The method of claim 7, further comprising the steps of:

repeatedly reading into memory a pre-determined number of inner hit rows stored on mass store for the corresponding in-file inner partition until all the inner hit rows have been read into memory.

16. The method of claim 7, wherein the outer partition selected for writing to memory is an in-file outer partition having the greatest number of full outer buffers linked to it.

17. The method of claim 7, wherein the outer partition selected for writing to memory is an in-memory outer partition having the greatest number of full outer buffers linked to it when no in-file outer partition exists.

18. The method of claim 7, wherein the in-file outer partitions are maintained in a first double linked list in ascending order on the number of full outer buffers linked to each in-file outer partition and the in-memory outer partitions are maintained in a second double linked list in ascending order on the number of full outer buffers linked to each in-memory outer partition.

19. The method of claim 7, wherein the steps of joining of each in-memory outer partition and the inner table and joining of each in-file outer partition with the corresponding inner partition are performed on different computer processors.

20. A computer-readable medium having computer-executable modules for joining data rows from two tables which have a common data column, where a smaller one of the two tables is designated as an outer table and a larger one of the two tables as an inner table, the computer-executable modules comprising:

a partition_outer_table module for partitioning, into a plurality of outer partitions, all rows in the outer table that satisfies a selection criteria, and for writing full buffers linked to an outer partition to mass storage, wherein an outer partition with rows stored on mass storage is an in-file outer partition;

a partition_inner_table module for partitioning, into a plurality of inner partitions, all rows in the inner table that satisfied the selection criteria, and for returning a partition number of an in-memory outer partition, wherein an in-memory outer partition has rows stored only in buffers;

a partition_function module for generating the partition number based on a value in the common data column of a row using a first hashing algorithm so that there is a one-to-one correspondence between the inner and outer partitions and for storing rows in buffers logically linked to the inner and outer partitions;

an inactive_state_of_hybrid_hash_join module for returning a first full buffer logically linked to each inner partition corresponding to an in-memory outer partition;

a fetch_inner_table module for returning subsequent full buffers linked to each inner partition corresponding to an in-file outer partition;

a fetch_from_partition module for reading rows from any in-file outer partitions into a pre-determined amount of memory, and for reading a pre-determined number rows from the corresponding inner partitions into memory;

a build_hash_table module for building a first hash table, using a second hashing algorithm, from the rows in the outer partition corresponding to the inner partition linked to each full buffer, and for building a second hash table, using the second hashing algorithm, from the memory-resident rows of any in-file outer partition;

a probe_hash_table module for searching, using the second hashing algorithm, the first hash table for a row that matches each row in full buffer linked to an inner partition, and for searching, using the second hashing algorithm, the second hash table for a row that matches each memory-resident row from the inner partition corresponding to an in-file outer partition; and a hash_function module for assigning rows in the first and second hash table to a first and second plurality of hash table buckets.

21. A hybrid hash join process for joining data rows from two tables which have a common data column, where a smaller one of the two tables is designated as an outer table and a larger one of the two tables as an inner table, the hybrid hash join process comprising:

partitioning means for assigning hit rows in the inner and outer tables to corresponding pluralities of inner and outer partitions, respectively, based on values in the common data column, wherein a hit row is a row in a table that satisfies a selection criteria;

buffer recovery means to recover buffers linked to the plurality of outer partitions by writing outer hit rows in a full outer buffer to mass storage; and searching means for searching each outer partition for a matching outer hit row for each inner row assigned to the corresponding inner partition, the searching means comprising:

in-memory searching means for searching outer partitions having all outer hit rows in memory; and in-file searching means for searching outer partitions having at least one outer hit row written to mass storage.

22. The hybrid hash join process of claim 21, wherein the in-file searching means reads outer hit rows from mass storage into memory before searching for the matching outer hit row.

23. The hybrid hash join process of claim 21, wherein the partitioning means employs a first hashing means to assign the inner and outer hit rows to the inner and outer partitions, and the searching means employs a second hashing means to create the data structure for each outer partition.

24. The hybrid hash join process of claim 21, wherein the searching means creates a data structure for an outer partition and probes the data structure to find the matching outer hit row.

25. The hybrid hash join process of claim 24, wherein the searching means builds a binary tree for the data structure.

26. The hybrid hash join process of claim 21, wherein the in-memory searching means searches the outer hit rows assigned to an outer partition when an inner buffer linked to the corresponding inner partition becomes full during the partitioning of the inner table and all the outer hit rows assigned to the corresponding outer partition are in memory.

27. The hybrid hash join process of claim 26, wherein the in-memory searching means further searches the outer hit rows assigned to an outer partition when the inner buffer linked to the corresponding inner partition is partially full after all inner hit rows have been partitioned and all the outer hit rows assigned to the corresponding outer partition are in memory.

28. The hybrid hash join process of claim 26, wherein the in-memory searching means discards the inner hit rows in a full inner buffer when the corresponding outer partition is empty.

29. The hybrid hash join process of claim 26, wherein the in-memory searching means discards each inner hit row in a fall inner buffer when all outer hit rows assigned to the corresponding outer partition has empitied.

* * * * *